United States Patent

Braun et al.

[15] 3,679,834

[45] July 25, 1972

[54] BYLINK CIRCUIT

[72] Inventors: Edwin Julius Braun; Rodney Robert Maxon; Henry August Meise, Jr.; George William Taylor; Ronald Kirk Witmore, all of Boulder, Colo.

[73] Assignee: Bell Telephone Laboratories, Incorporated, Murray Hill, N.J.

[22] Filed: Dec. 21, 1970

[21] Appl. No.: 99,899

[52] U.S. Cl. ....................179/18 C

[51] Int. Cl. ....................H04q 3/42

[58] Field of Search....................179/18 C, 18 EB

[56] References Cited

UNITED STATES PATENTS 3,376,392 4/1968 Verhille ....................179/18 C

*Primary Examiner*—William C. Cooper

*Attorney*—R. J. Guenther and James Warren Falk

[57] ABSTRACT

A switching system is disclosed having improved bylink facilities for interconnecting a calling trunk circuit with an idle digit register. The bylink comprises a single conductor that is connected to all trunk circuits and to all registers. The registers and the trunk circuits have gating elements which are selectively enable by the system controller so that only a single trunk circuit and a single register may be connected signalwise at a time by the bylink bus. If a dial pulse is received prior to the time a bylink path is established, the trunk is connected to a busy tone source and the call is not completed.

11 Claims, 14 Drawing Figures

INVENTORS E. J. BRAUN
R. R. MAXON
H. A. MEISE JR.
G. W. TAYLOR
R. K. WITMORE
BY
Donald M Duft
ATTORNEY

INVERTING "OR" GATE

INVERTING "AND" GATE

BYLINK CIRCUIT

BACKGROUND OF THE INVENTION

This invention relates to a switching system, and in particular to a switching system having improved bylink signaling facilities.

The control of telephone switching equipment by subscriber generated dial pulses requires that pulse registration equipment be attached to the calling circuit prior to the time the first pulse is received. This requirement presents no problem in step-by-step offices since the dial pulse responsive equipment comprises an inherent portion of each switching stage. This requirement also presents no problem in local offices of the common control types since in these, the subscriber dialing operation is effectively delayed by withholding the return of dial tone until the pulse registration equipment is available and attached to the calling circuit.

The requirement that a dial pulse register be attached to a calling circuit prior to the reception of the first dial pulse presents its greatest problems when subscribers served by local step-by-step offices are permitted access to common control type toll offices or to PBXs arranged for inward dialing. For example, a step-by-step office may obtain a connection to the PBX following the dialing of a few digits. Following this, the customer then dials the remainder of the digits appropriate for the type of call being served. It is obvious that the PBX can serve the call only if all pulses that are directed to it are satisfactorily registered.

It is common practice in serving such calls to use fast acting bylink networks to provide an immediate, but temporary path between the calling trunk circuit and an idle register prior to the time the main switching network of the office is able to establish a path between these two circuits. The bylink network comprises contacts of the same relays that control the operation of the main network. A second commonly used expedient is the provision of dial pulse counters in each incoming trunk circuit. Neither expedient is ideal. The use of bylink equipment is expensive and often is not sufficiently fast in its operation to prevent digit mutilation on calls where a subscriber dials at a rapid rate. The use of counters in each trunk circuit is expensive. Since there are many trunk circuits in a typical office, this greatly increases the cost of the office and represents an expensive solution to the problem.

The prior art bylink facilities are also further disadvantageous since they are unsuitable for use in electronic type switching systems utilizing end marked networks. In these systems, the network responds to marking potentials on its line side and trunk side appearances to establish paths between the circuits associated with the marked appearances. Since these networks are inherently self-controlled, they utilize no relays and therefore, there are no relay contacts available, as in the prior art, to form a bylink network or signaling path.

BRIEF SUMMARY OF THE INVENTION

OBJECTS

It is therefore an object of the invention to provide improved facilities for registering dial pulses incoming from step-by-step type offices.

It is a further object to provide improved facilities for quickly interconnecting a calling trunk circuit and an idle register in such a manner that overcomes the disadvantages of the prior art arrangements.

SUMMARY DESCRIPTION

In accordance with our invention we provide a signaling path, hereinafter termed a bylink bus, which permanently interconnects all incoming trunk circuits and all dial pulse registers. Each incoming trunk circuit has a selectively controllable gate interconnected between the bylink bus and the circuitry of the trunk circuit that receives the subscriber dial pulses. Similarly, each register contains a selectively controllable gate which is interconnected between the bylink bus and the pulse detecting and counting circuitry of the register.

When a trunk circuit receives a call, the gate of a trunk circuit and the gate in a selected register are promptly enabled by a system controller. This interconnects the trunk circuit and the register signalwise via the bylink bus so that any pulses received from the preceding office may be transmitted directly to the register from the trunk circuit even though a network path between the two circuits is not yet established. The bylink path is disabled between these two circuits as soon as a network path is established.

Our invention is disclosed in conjunction with a wired logic electronic type PBX having a system controller which regulates and governs the sequence of circuit actions required for the serving of each call by the system. When a trunk circuit first receives an incoming call from a step-by-step office, it transmits a signal to this effect to the system controller. The system controller, in turn, scans all trunk circuits to identify the one that is requesting service, selects an idle digit register and, by means of marking potentials, requests the main switching network of the office to interconnect the calling trunk circuit and the selected register. At the same time, the system controller enables the gate in the calling trunk circuit and a gate in the selected register to connect both circuits signalwise with the bylink bus. The enabling of gates rapidly establishes a signal path by means of which any dial pulses received by the trunk circuit may be transmitted over the bylink bus to the register and stored in that circuit for subsequent use in establishing the desired call connection. The bylink connection remains in effect until the switching network completes a path between the two circuits. At that time, the network transmits a "path complete" signal to the controller which, in response thereto, inhibits the trunk circuit and the register gates to disconnect them signalwise from the bylink bus. All subsequently received dial pulses are then tranSmitted from the trunk tO the register over the regular switching network, and the bylink bus is free to serve calls received by other trunk circuits requiring bylink service.

The bylink path provided by our invention is established promptly and therefore the possibility is remote that a bylink path will not be available prior to the reception of the first dial pulse. However, under certain adverse system conditions, namely those in which the system controller is already busy and not available to serve a newly received bylink call, it is possible that the gates will not be enabled with sufficient speed to establish the bylink path prior to the reception of a pulse. In order to provide for such contingencies, the trunk circuit, in accordance with our invention, contains circuitry which detects the arrival of the first pulse and transmits an appropriate signal to the system controller. If this signal is received subsequent to the establishment of the bylink path, the signal is disregarded since all pulses received by the trunk circuit will be transmitted over the bylink bus to the register. On the other hand, if this signal is received prior to the establishment of the bylink path, the controller does not establish a path to a digit register; instead, it initiates the circuit actions required to return a reorder tone to the trunk circuit to inform the customer that the call should be retried.

Our invention also contains facilities whereby a digit lost in the final stage of a step-by-step office may be regenerated and entered into the register ahead of the remaining digits that are received by the PBX and transmitted from the trunk to the register. This expedient permits the register to receive all of the digits it requires on each call, irrespective of the office from which the call is received by the PBX.

This digit is regenerated by (1) grouping the incoming trunk circuits so that each circuit of a group requires the same regenerated digit and (2) by providing a service request lead individual to such trunk group. Each time the common control receives a service request, it determines over which lead the request is received, generates a prefix digit unique to the lead and transmits this prefix digit to the register prior to the time the register receives pulses from the calling trunk circuit. The generated prefix digit is transmitted over a special bus common to all registers. Each register has a gate which interconnects the prefix bus with the digit storage portion of the register. The system controller enables this gate when the register is selected for use on a call. Subsequently, when the prefix digit information is applied to the prefix bus, only the register whose gate is enabled responds to the information on the bus.

FEATURES

A feature of the invention is the provision of a bylink bus which interconnects all incoming trunk circuits and all digit register circuits.

A further feature is the provision of gating circuitry in each trunk circuit and each register which provides a path for the pulse generating and the pulse counting circuitry of a selected trunk and a selected register to be connected signalwise by the bylink bus.

A further feature is the provision of facilities for disabling the bylink path as soon as a network connection is established between the two circuits.

A further feature is the provision of facilities in each trunk circuit for detecting the arrival of a first dial pulse, for transmitting a signal to this effect to a system controller.

A further feature is the provision of facilities in system controller effective upon the receipt of the signal prior to the establishment of the bylink path for connecting the trunk circuit to a tone source signifying that the call cannot currently be successfully completed.

A further feature is the provision of facilities for dividing the trunks into groups in accordance with the prefix digit required for each group, facilities for providing a service request signal unique to each group, together with facilities in the common control for generating a prefix digit unique to the request signal, and facilities for transmitting the prefix digit to a selected register over a path common to all registers and independent of the bylink bus.

These and other objects and features of this Invention may be readily understood when taken in conjunction with the following description and drawing in which:

DRAWING

FIGS. 1A through 1D, when arranged as shown on FIG. 1E, disclose a system embodying our invention;

Figure 5F:
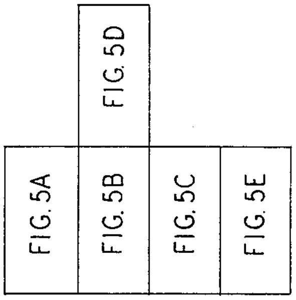

FIGS. 5A through 5E, when arranged as shown in FIG. 5F disclose additional details of the invention beyond those shown on FIGS. 1A through 1E.

GENERAL DESCRIPTION—FIGS. 1A, 1B, 1C, and 1D

The present invention is shown embodied as part of a PBX system of the type disclosed in the H. H. Abbott et al. U.S. Pat. No. 3,377,432 of Apr. 9, 1968 which is hereby incorporated as part of the present specification to the same extent as it fully sets forth herein. The Abbott et al. patent discloses a wired logic electronic PBX which has an end marked network. The various traffic circuits such as line circuits, trunk circuits, registers, etc., are connected to each other, during the serving of calls, by the network under the control of a system controller which receives service requests and other call state signals from the traffic circuits and, in response thereto, initiates the necessary circuit actions so that each circuit receives the call service it requires. The system controller itself comprises a solid state wired logic circuit which detects the service requests and call signals and serves them sequentially, one at a time, in a sequence that is determined by the wired logic.

FIGS. 1A through 1D disclose an end marked network 101, and a system controller 102 which is termed "common control". The network is connected on its left side over a plurality of paths 103–1 through **103–*n* extending to line circuits; the network is connected on its right side to a plurality of central office trunk circuits 104–1 through 104–*n*. The network is also connected on its trunk side to intraoffice trunk circuit 106. The system also includes a plurality of register circuits 105–1 through 105–*n* each of which has appearances on both the line side and the trunk side of the network. Each register has appearances on both sides of the network so that it may be connected via the network to one of trunk circuits 104–1** for an incoming call, or to one of the line circuits on an intra-PBX call. The switching network is of the end marked type and in response to the presence of a marking potential on each side thereof, it establishes, independently of the remainder of the system, a network path between the circuits associated with the marked terminals.

The system is of the common control tyPe in which common control 102 governs the order in which the various traffic circuits are interconnected by the network during the serving of each call. Common control receives service request and other call state signals from the traffic circuits. The signals are applied within common control to a mode control circuit 106 which functionally arranges the signals in a predetermined order of preference as determined by the wired logic of the circuit. When the circuit actions required by a signal are to be served, the mode control 106 assumes a state unique to the signal to be served. From then on the mode control and common control together regulate the operation of the requesting circuit and control the establishment of a connection via the network between the requesting circuit and any other circuit with the system with which it must be connected.

Each of the central office trunk circuits is connected over a tip and ring (T,R) conductor path to a central office. On its left side, each central office trunk circuit is connected over a path designated T,R,S,C to an appearance on the switching network. The T,R and S symbols represent the tip, ring and sleeve conductors respectively, while the C symbol represents the control conductor for the end marked network. Each central office trunk circuit is further connected by a conductor designated BYB to a bylink bus 107 which is vertically oriented on FIG. 1A and 1B. The bylink bus extends to all central office trunk circuits 104 and to all registers 105.

When a central office trunk circuit receives a call, the system responds, as subsequently described, to cause the switching network to establish a path between the calling trunk circuit and an idle digit register. Since this network path is not established instantaneously, the bylink bus 107 is provided in accordance with our invention as a dial pulse signal path between the calling trunk circuit and idle register prior to the time a network path is established between these same two circuits. The bylink path is used only briefly on a call, namely, until the network path is established between the trunk circuit and the register. When this occurs, the bylink bus is disconnected signalwise from the two circuits and made available for use on those calls requiring bylink service.

The following describes the manner in which the system of FIGS. 1A, 1B, 1C and 1D serve an incoming call requiring bylink service. It is assumed that this call is received by central office trunk circuit 104–1. It is further assumed that the call is served by register 105–1.

Figure 1A:
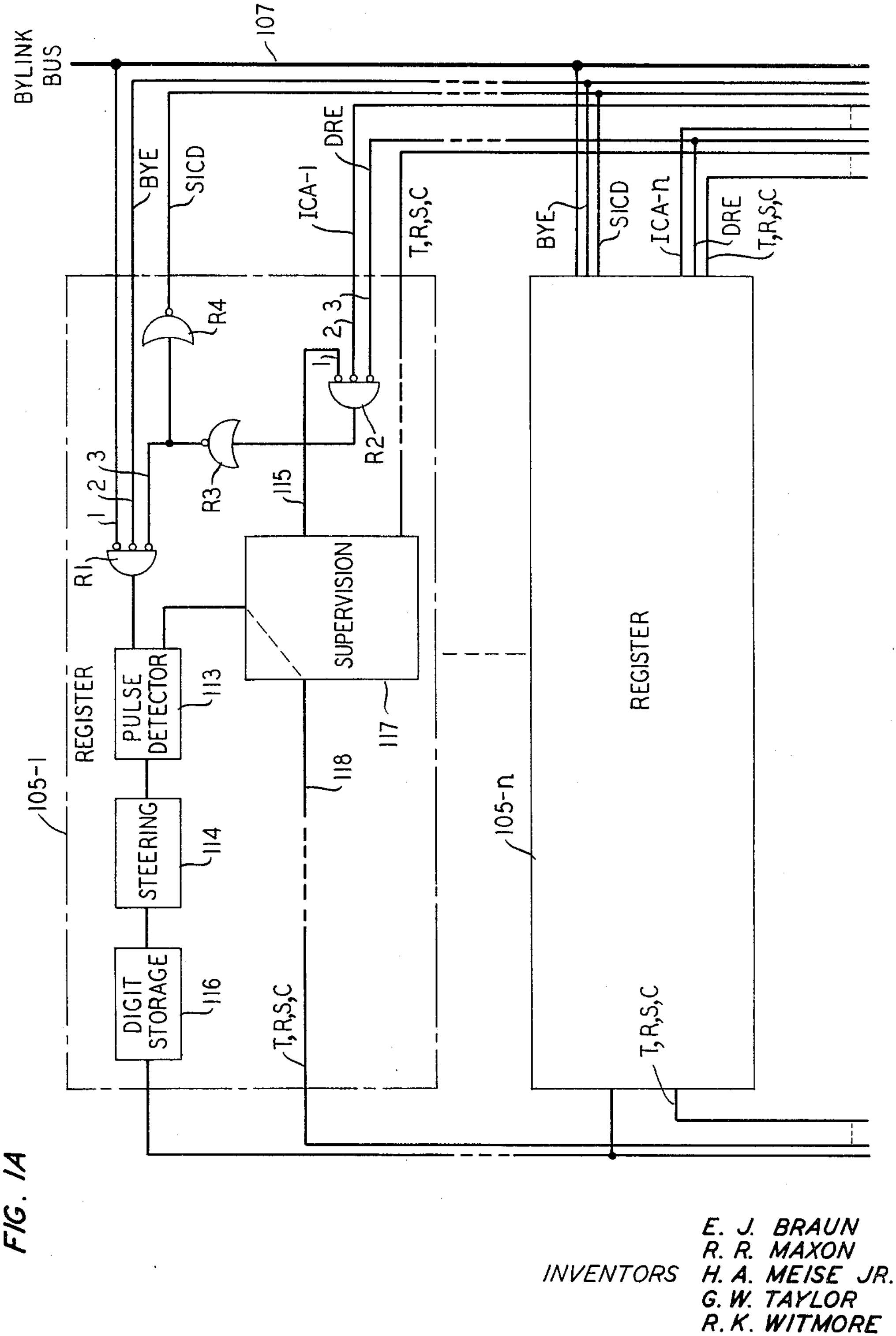
Figure 1B:
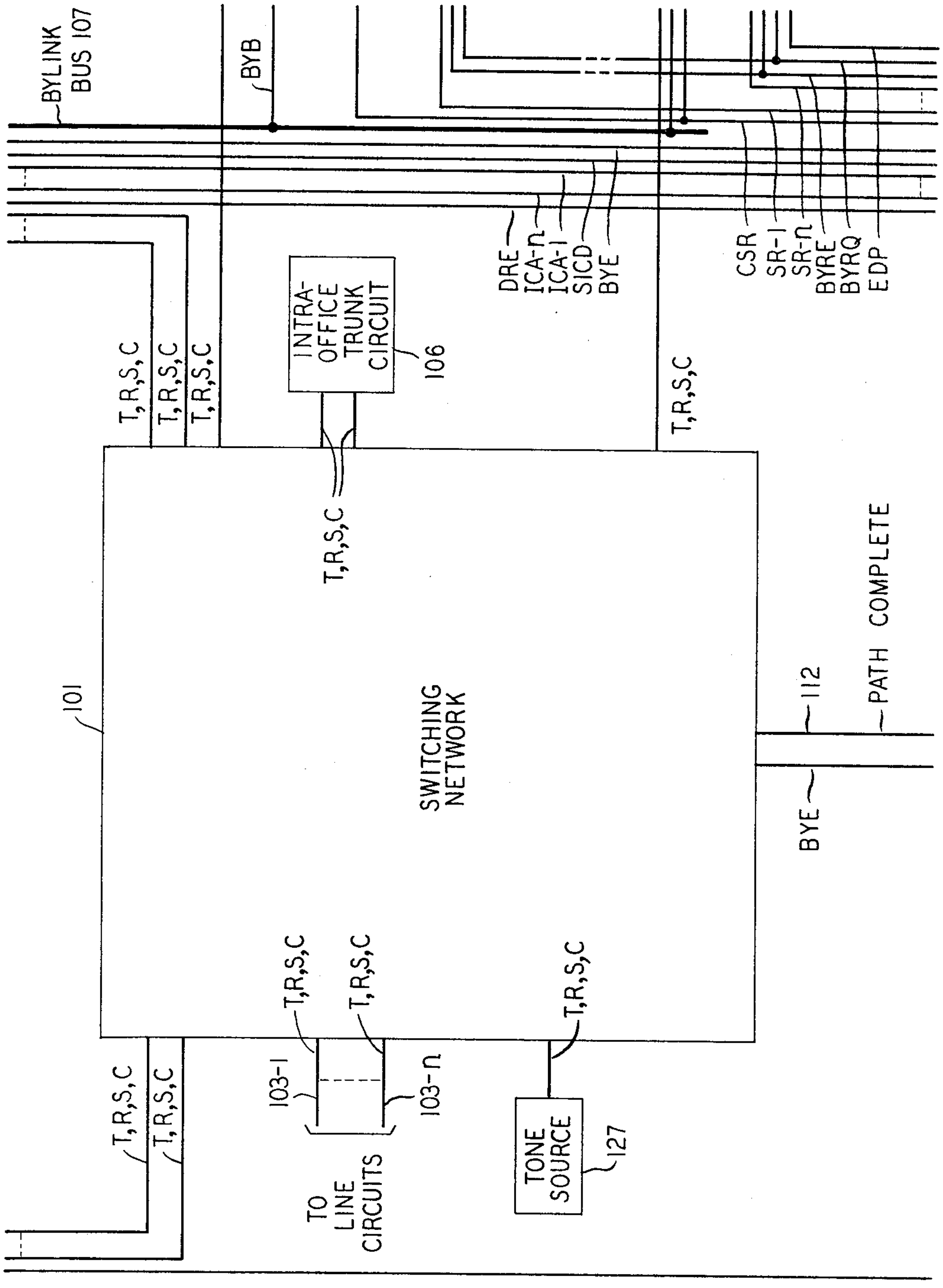
Figure 1C:
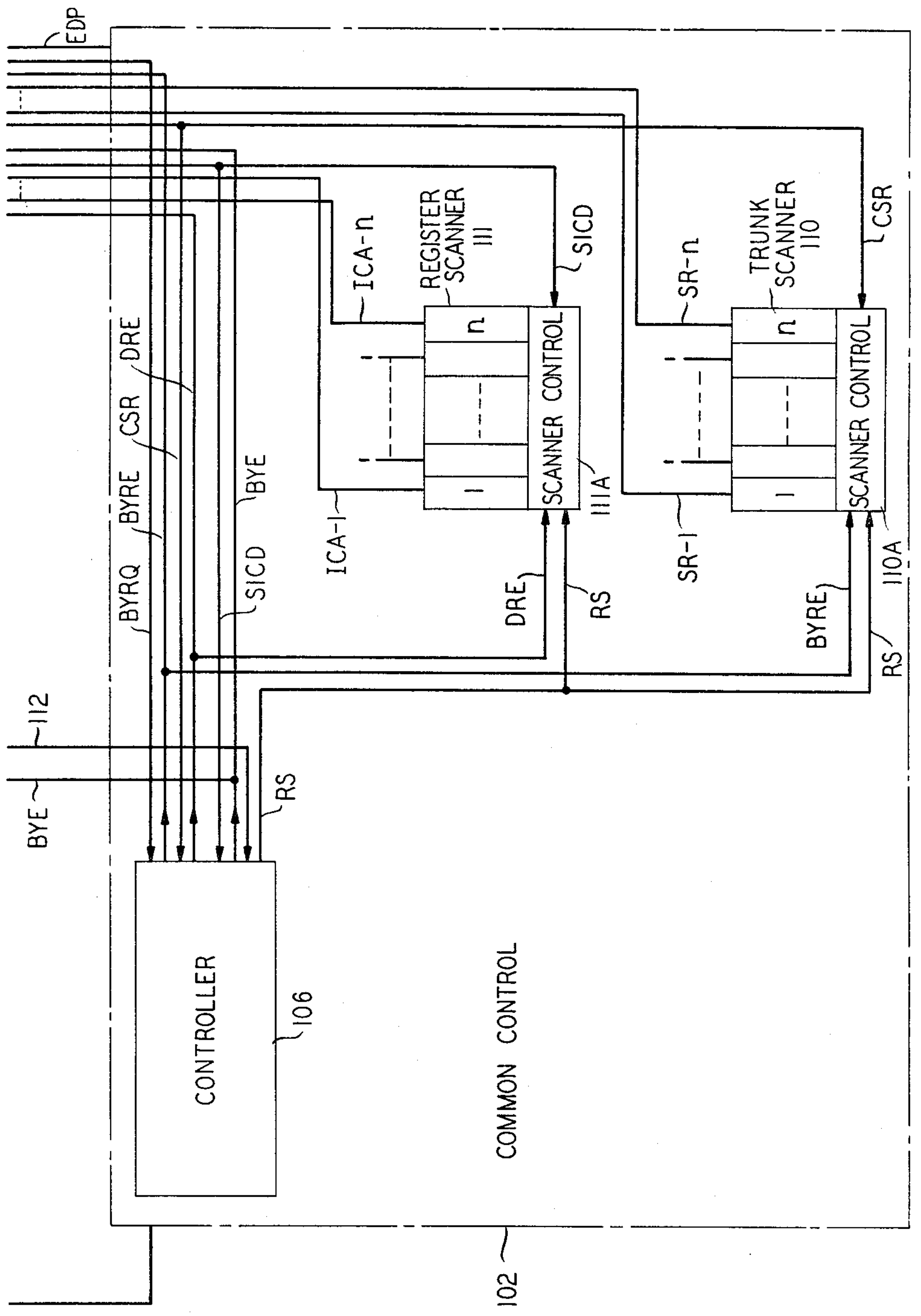
Figure 1E:
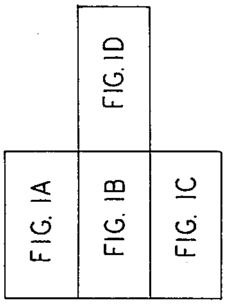
Figure 1D:
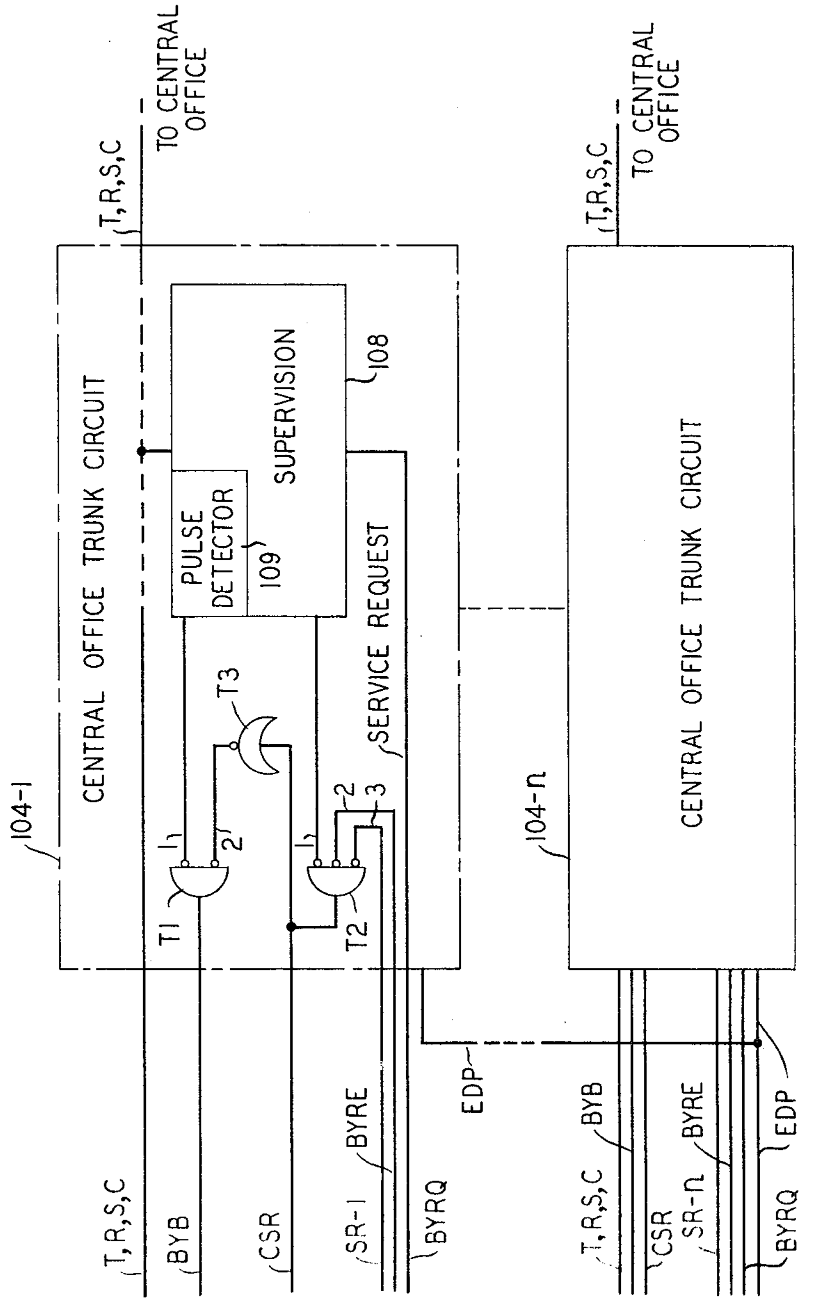

The receipt of the call by trunk circuit 104–1 is detected by its supervision circuit 108 which in turn applies a service request signal over conductor BYRQ extending from FIG. 1D to controller 106 on FIG. 1C. As is subsequently described in detail, the receipt of this signal causes the controller to initiate the sequence of circuit actions required for serving the call. As a first step in this process, the controller applies an enable signal to its output conductor BYRE extending to the trunk scanner 110 of FIG. 1C and also extending to input 2 of AND gate T2 within trunk circuit 104–1. The 1 input of the AND gate is enabled by the supervision circuit when the call is received. The AND gate cannot turn on until it receives an enable signal on all three of its inputs.

Trunk scanner 110 comprises a counter having a counting position unique to each trunk circuit. A separate conductor connects each position of the scanner with the trunk circuit to which the position is individual. Thus, for example, scanner position 1 is connected by conductor SR-1 to the 3 input of AND gate T2 in trunk circuit 104–1. In response to the reception of the signal on conductor BYRE, scanner 110 begins a counting operation, and applies an enable potential to its output conductors sequentially one at a time. When the scanner is in its counting position 1, it applies an enable potential to conductor SR–1 to effect a scanning of trunk circuit 104–1. The enable potential on the 3 input of AND gate T2 turns the AND gate on since all of its inputs are now enabled. The turn-on of the gate applies a signal from its output through gate T3 to the 2 input of AND gate T1. The output signal of gate T2 is also extended over conductor CSR and applied as a stop-scan signal to scanner control 110A. The receipt of this signal stops the scanner in the operative position associated with trunk circuit 104–1. This signal is also applied over the CSR lead to the controller to advise it that the calling trunk circuit has been scanned and identified.

The controller now initiates the sequence of operations required to select an idle register. A register is selected by the register scanner 111 which has an operative position for each register and an output conductor extending from each output position to a different register. Thus, register scanner position 1 is associated with register 105–1 and the scanner output conductor ICA–1 extends from position 1 of the register scanner to the 2 input of AND gate R2 within register 1.

The mode control initiates the selection of the register by applying an enable potential to conductor DRE. This conductor extends to the input of register scanner control 111A to initiate a register scanning operation. This conductor further extends to all registers in common. With respect to register 1, it extends to the 3 input of AND gate R2. Thus, the potential on conductor DRE enables the 3 AND gate input within all registers, the 2 AND gate input of a register is enabled only when the register is scanned. The input 1 of AND gate R2 is enabled by conductor 115 when the register is idle and is inhibited when the register is busy. Thus, assuming that register 1 is idle, its 1 input is currently enabled and its 3 input is enabled by the potential on conductor DRE. Subsequently, when scanner 111 scans register 1, the enable potential on its output conductor ICA–1 is received by the 2 input of AND gate R2. At this time all three inputs of the gate are enabled and the gate switches state to generate a gate output signal. This output signal is extended through OR gate R3 and applied to conductor SICD which extends to input 3 of AND gate R1. This conductor also extends to scanner controller 111A where it now applies a stop scan signal as an indication that an idle register, namely register 105–1 has been selected for use on the call. This signal on conductor SICD is also extended to controller 106 to inform it that an idle register has been selected and that the next sequence of operations required to serve the call may now be initiated.

With the calling trunk identified and an idle register selected, the controller next causes common control to mark the C lead network appearance of the trunk circuit. It also causes the C lead appearance on the left side of the switching network of the selected register to be marked. The circuitry by means of which the marking potentials are applied is not shown on FIG. 1 since such circuitry is shown in detail in the Abbott et al. patent. The network is of the end-marked type, and it now responds to the marking potentials to initiate the establishment of a path between the calling trunk circuit and the selected register. Since the network path requires a finite period of time for its establishment, the bylink bus provided in accordance with our invention provides a signal path by means of which incoming dial pulses may be transmitted to the register prior to the establishment of the network path.

The controller next applies an enable potential to its output conductor BYE which extends to the 2 input terminal of AND gate R1 in each register. The 1 input of the R1 gate is connected directly to the bylink bus, the 3 input is connected via gate R3 to the output of AND gate R2. The 3 terminal of AND gate R1 for register 1 is enabled by the scanning potential on conductor ICA–1. The R2 gate in each other register is not currently enabled by the scanner and therefore the 3 input of the R1 AND gate of all registers is also not enabled. Only the R1 AND gate of register 1 has all of its inputs enabled at this time, and only it may now turn on under control of a dial pulse signal received at its 1 input terminal from the bylink bus.

Let it be assumed that one or more dial pulses are received at this time by trunk circuit 104–1. The reception of these pulses on its T and R conductors is detected by pulse detector 109 and applied to the 1 input terminal of AND gate T1. The 2 input of the gate is enabled at this time by means of gates T2 and T3 as already described. Therefore, the pulses applied to the 1 input of gate T1 are passed therethrough to the bylink bus. From there they are applied to the 1 input of AND gate R1 in register 105–1 to switch its conductive state as each dial pulse is received. The output of gate R1 constitutes a regeneration of the received dial pulses. These regenerated pulses are applied to pulse detector 113, and from there are applied by means of the steering circuit 114 to the digit storage portion 116 of the register.

The pulses received by the trunk circuit are transmitted over the bylink bus path only until the switching network completes the establishment of a network path between the calling trunk circuit and register 1. When the network path is established, the network transmits a path complete signal over conductor 112 to the mode control circuit to advise it that the network path has been completed and that the bylink bus may now be released for use on other calls. In response to the receipt of this signal the controller removes the enable potential from conductor BYE. This disables gate R1 of the register and thereby disconnects the register signalwise from the bylink bus. Next the controller resets itself, thereby removing the potential on lead BYRE. The resetting of the controller also removes the enable potential from its output conductor DRE extending to the 3 input of AND gate R2 of register 1. This signal has no immediate effect on the gate since the idle-busy conductor 115 extending from the register supervision circuit 117 applies an inhibit potential to the 1 input of the gate as soon as the register is seized for use on the call by the switching network. In other words, supervision circuit 117 detects the establishment of the path to the register by the network and switches the potential on conductor 115 from an enable to an inhibit potential as the register switches from an idle to a busy state. This potential in itself inhibits AND gate R2 and by means of gate R3, inhibits the 3 input of gate R1 so that this gate will no longer respond to pulses on the bylink bus. This also effectively disconnects the pulse detector 113 signalwise from the bylink bus.

The resetting of the controller 106 further removes the enable potential from its output conductor BYRE extending to the 2 input of AND gate T2 of trunk circuit 1. This switches the gate to its inhibit state and, by means of gate T3, switches AND gate T1 to its inhibit state so that pulse detector 109 of the trunk supervision circuit 108 is disconnected signalwise from the bylink bus. The disconnection of trunk circuit 1 and register 1 from the bylink bus permits the bus to be used on other calls requiring bylink service. From then on, all further pulses received by trunk circuit 104–1 are transmitted over its tip and ring path, through the switching network to the trunk side appearance of the register. From there, the pulses are extended over path 118 to the supervision circuit 117 of the register which applies them to the pulse detector 113. These pulses are then detected steered and counted in the same manner as described for the reception of the bylink pulses. The Abbott et al. patent fully describes the operation of a digit register in a wired logic electromechanical switching system.

Figure 2:
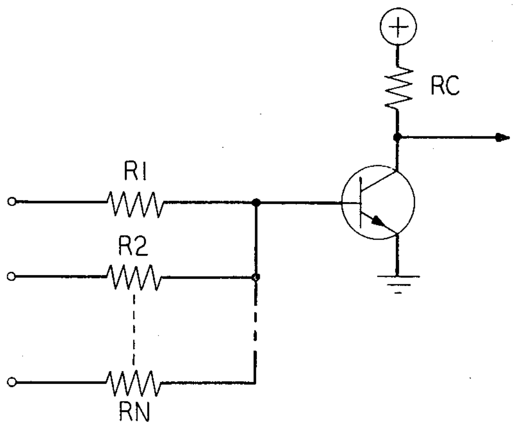
FIG. 2 illustrates the basic transistor resistor logic converter circuit that is used in our system as both an AND and an OR gate.
Figure 3:
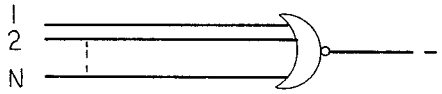
FIG. 3 illustrates the symbols used when the circuit of FIG. 2 is operated as an inverting OR gate.
Figure 4:
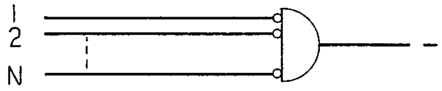
FIG. 4 illustrates the symbol used when the circuit of FIG. 2 is operated as an inverting AND gate.

LOGIC CIRCUITS—FIGS. 2, 3, and 4

The disclosed system makes extensive use of transistor resistor logic circuits in which a single transistor stage is used as an inverter, an inverting AND gate, or an inverting OR gate, depending upon the nature of the input signals applied thereto and the function to be performed by the stage. FIG. 2 discloses a schematic of a circuit which comprises a single NPN transistor, a collector resistor RC and a plurality of input resistors, R1–R*n*, of which there is one for each input. The circuit of FIG. 2 is basically a single-stage inverter since a positive-going signal applied to the base appears as a negative-going signal at the collector, and vice versa.

The stage may be used as an inverting OR gate by leaving the circuit normally cut off, i.e., all inputs LOW (ground). In this case, a positive going signal applied to one or more input leads will turn the transistor ON and provide a negative-going signal on the collector. The stage also may be used as an inverting AND gate. In this case the transistor is normally held ON by a positive signal applied to one or more of its inputs. The AND condition of the circuit is achieved by a ground potential on all inputs. This turns the transistor OFF and produces a positive-going signal at its output.

FIG. 3 discloses the symbol utilized when the transistor circuit of FIG. 3 is operated as an inverting OR gate, FIG. 4 discloses the symbol utilized when the circuit of FIG. 2 is operated as an inverting AND gate.

DETAILED DESCRIPTION—FIGS. 5A, 5B, 5C, 5D, and 5E

FIGS. 5A through 5E together disclose additional details of the circuitry and equipment required to permit a wired electronic system of the Abbott et al. type to serve calls on a bylink basis. The complexity of the drawing figures have been simplified by disclosing only diagrammatically equipment that is well known in the art such as that shown in Abbott et al. Also, the drawing figures disclose in detail only the equipment and circuitry that is necessary for an understanding of our invention.

Drawing FIGS. 5A through 5E disclose in additional detail, the same system already described in connection with drawing FIG. 1. In order to facilitate an understanding of drawing FIGS. 5, each element on FIGS. 5 corresponding to an element on drawing FIGS. 1 is designated in a manner that facilitates an understanding of the correspondence. For example, switching network 501 on FIG. 5B corresponds to network 101 on FIG. 1B; common control 502 on FIG. 5C corresponds to common control 102 on FIG. 1C; etc. Further, the conductor designations on FIG. 5 are identical to those on FIGS. 1 where direct correspondence exists. However, a one for one correspondence of all elements within the trunks circuits, the registers and the common control does not exist since these circuits are shown in considerably more detail on FIGS. 5 than on FIGS. 1. The embodiment of FIGS. 1 is simplified in order to facilitate an understanding of the basic principles of the invention. In so doing, a single circuit element, such as a gate, on FIGS. 1 may actually represent a plurality of gates on FIGS. 5 with the plurality of gates performing the basic function generally described with respect to the single gate on FIG. 1.

The operation of the system shown on FIGS. 5 is described with the same assumptions made in connection with the description of FIGS. 1, namely, that a call requiring bylink service is received by trunk circuit 504–1 and that register 505–1 is idle and will be selected to serve the call. The receipt of this call is detected by the trunk circuit and by its supervision circuit 508. The supervision circuit 508 includes a pulse detector 509 and a busy-idle circuit 529. Output conductor 519 extends from the busy-idle circuit 529 to indicate the on-hook and off-hook status of the calling line. Circuit 529 applies off-hook signal (a busy) when the trunk is initially seized, it applies an on-hook signal (an idle) when the central office releases. Both of output conductors 521 and 519 are normally all low, and both go high when the supervision circuit detects the seizure of the trunk circuit. Flip-flop 1 is normally in a set state in which its 1 output is high and its 0 output is low. Flip-flop 2 is normally in a reset state in which its 1 output is low and its zero output is high. A flip-flop can be switched to a different state by making the input for the state low provided the other input is made high. A flip-flop does not change state when both of its inputs are concurrently high or concurrently low. The reset input of flip-flop 1 is normally high when the trunk circuit is idle.

With respect to AND gate T20 it may be seen that its input 1 is normally low since it is connected by the inverting OR gate 23 to the output 1 of flip-flop 1 which is normally in a set state in which its output 1 is high. Input 2 of gate T20 is normally high when the trunk circuit is idle by virtue of OR gate T22 whose input is connected to the low on conductor 519 from the output of the busy-idle circuit. However, when the trunk circuit is seized, conductor 519 goes high and by means of OR gate T22, drives input 2 of gate T20 low. With both of its inputs low, the gate turns off, drives its output high and by means of OR gate T24 drives the service request conductor BYRQ low. AND gate T21 has its inputs connected in parallel with those of AND gate T20 and it also switched to its OFF state at this time to drive its output high. This high is extended to the input of gate T25 and from the output of this gate is extended as a low to input 1 of AND gates T26 and T27. The function of these gates is subsequently described in detail. The low potential on conductor BYRQ is extended as a service request signal from trunk circuit 504–1 to an input of the mode control circuit 506 shown as part of the common control 502 on FIG. 5C. The mode control circuit 506 is of the same type as shown on FIGS. 26 through 28, 30 through 32, and 37 of the Abbott et al. Briefly, it comprises a solid state wired logic sequence circuit which accepts service request or call state signals from various parts of the system. It arranges these requests in a predetermined hierarchy so that in the event of the simultaneous reception of more than one request, the requests are served in an ordered sequence.

The mode control circuit 506 is shown as subdivided into a plurality of segments each of which receives a different type of call service request. These segments are designated 506–A through 506–*n* with the segment associated with conductor BYRQ being designated 506–D. If the mode control circuit 506 is idle when a request signal is received a conductor BYRQ, the circuit immediately responds to the requests and enters the mode associated with segment 506–D. If the mode control circuit is busy when the bylink request is received, or if a higher priority request is received simultaneously with the bylink request, the bylink request is not honored until all requests having a higher priority are served. In any event, when the bylink request is honored, the mode control circuit advances to its position 506–D and remains there until all circuit operations associated the bylink functions are completed. Mode control segment 506–D applies an output signal on its conductor 522 extending to the bylink sequence circuit 523 when it serves a bylink request.

The bylink sequence circuit is similar to the mode control circuit in that it also is a solid state sequence circuit which has a plurality of operative positions. In response to the receipt of a signal on conductor 522, it sequentially steps from its first to its last position. As it advances to each position it performs certain circuit operations unique to the position. It does not advance to the next position until it receives a return signal indicating that all circuit operation associated with its present position have been completed. Circuits of this type are well known in the art and are shown in the Abbott et al. patent.

In response to the receipt of an input signal from conductor 522, the bylink sequence circuit activates its position 523–A whose function is to select and identify the central office trunk circuit that is requesting bylink service. This segment of the bylink sequence circuit now applies a low to conductor BYRE which extends to all trunk circuits as well as to the control circuit 510A of trunk scanner 510. The low signal on conductor BYRE is extended within trunk circuit 504–1 to input 3 of both AND gates T26 and T27. Input 1 of both of these gates is currently held low by virtue of gates T21 and T25 as already described. Input 2 of gates T26 and T27 is currently held high and therefore the gates do not turn on at this time. The low signal on the BYRE conductor extending to all trunk circuits constitutes a group enable signal which prepares the trunk circuits for a subsequent scanning operation during which the trunk circuit requesting bylink service is identified. This group enable signal permits only the trunk circuit that is requesting this service to identify itself to common control when a trunk scanning operation takes place.

The low signal on conductor BYRE in common control is also extended to the control circuit 510–A of the trunk scanner 510. This activates scanner 510 and causes it to initiate a trunk scanning operation as already described in connection with FIGS. 1. When scanning takes place the scanner sequentially steps through its counting positions and drives the output of each segment or position low during the period of time the scanner remains in the position. With respect to the call now being described, output conductor SR–1 is driven low when the scanner advances to its position 1. Conductor SR–1 extends from the scanner to FIG. 5D where it is applied to input 2 of gates T26 and T27. Since the other two inputs of both of these gates are currently low, the reception of the scan signal turns both gates off and switches them to their AND state in which their output conductor is driven high. The high on the output of gate T26 is applied as a step-scan signal to conductor CSR–1 extending from FIG. 5D back to the common control circuit on FIG. 5C.

Figure 5A:
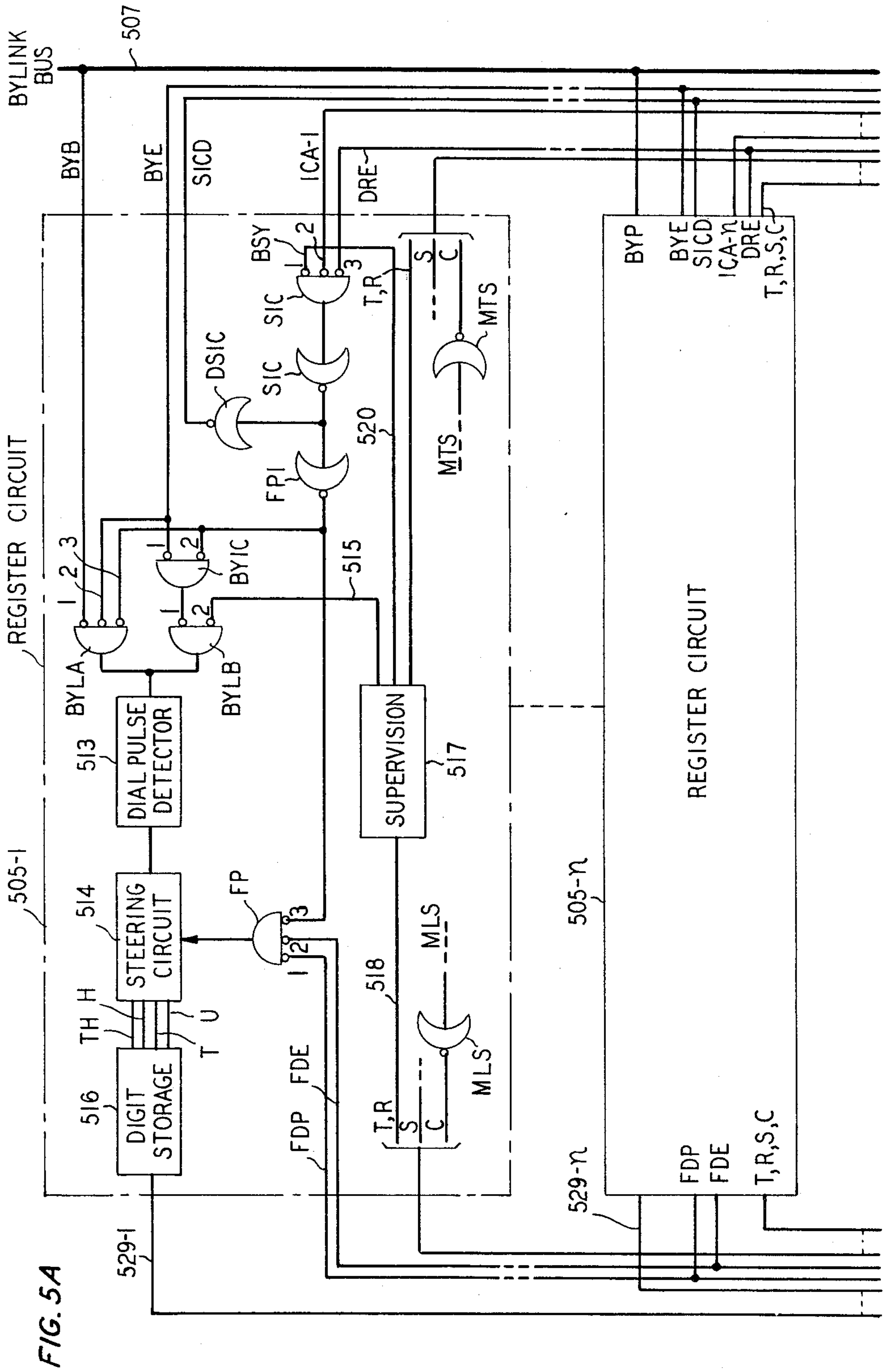
Figure 5B:
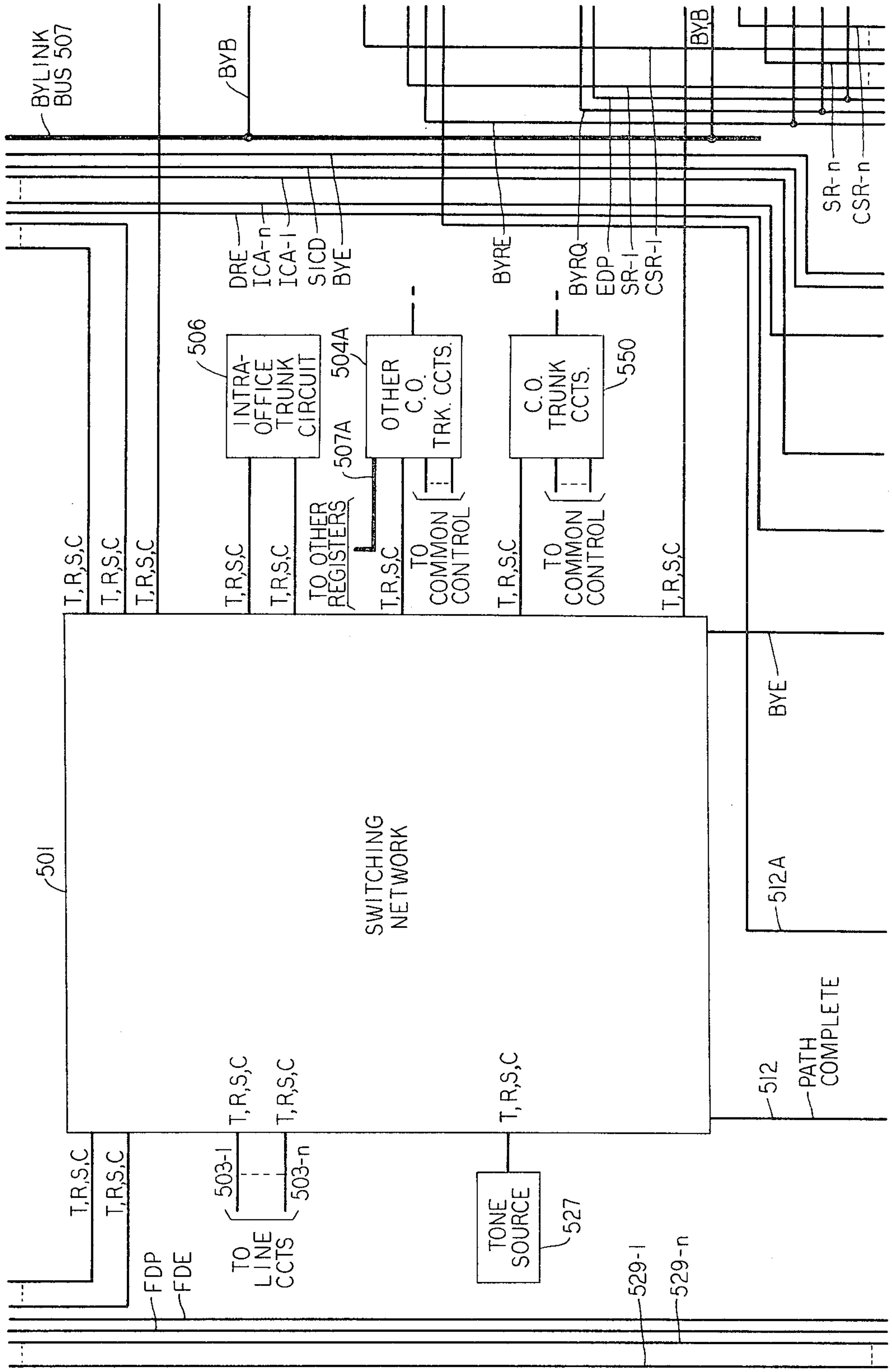
Figure 5C:
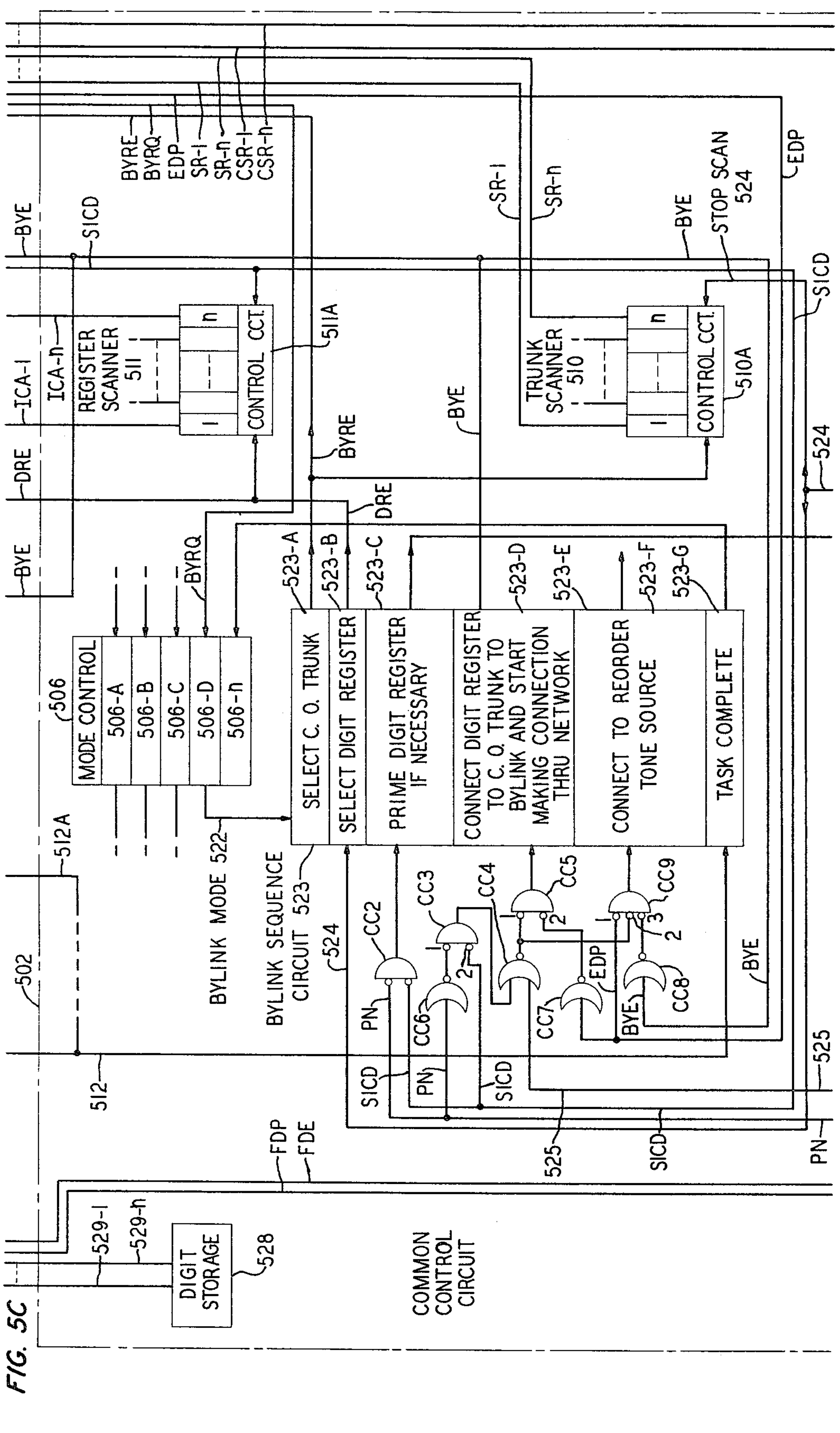
Figure 5D:
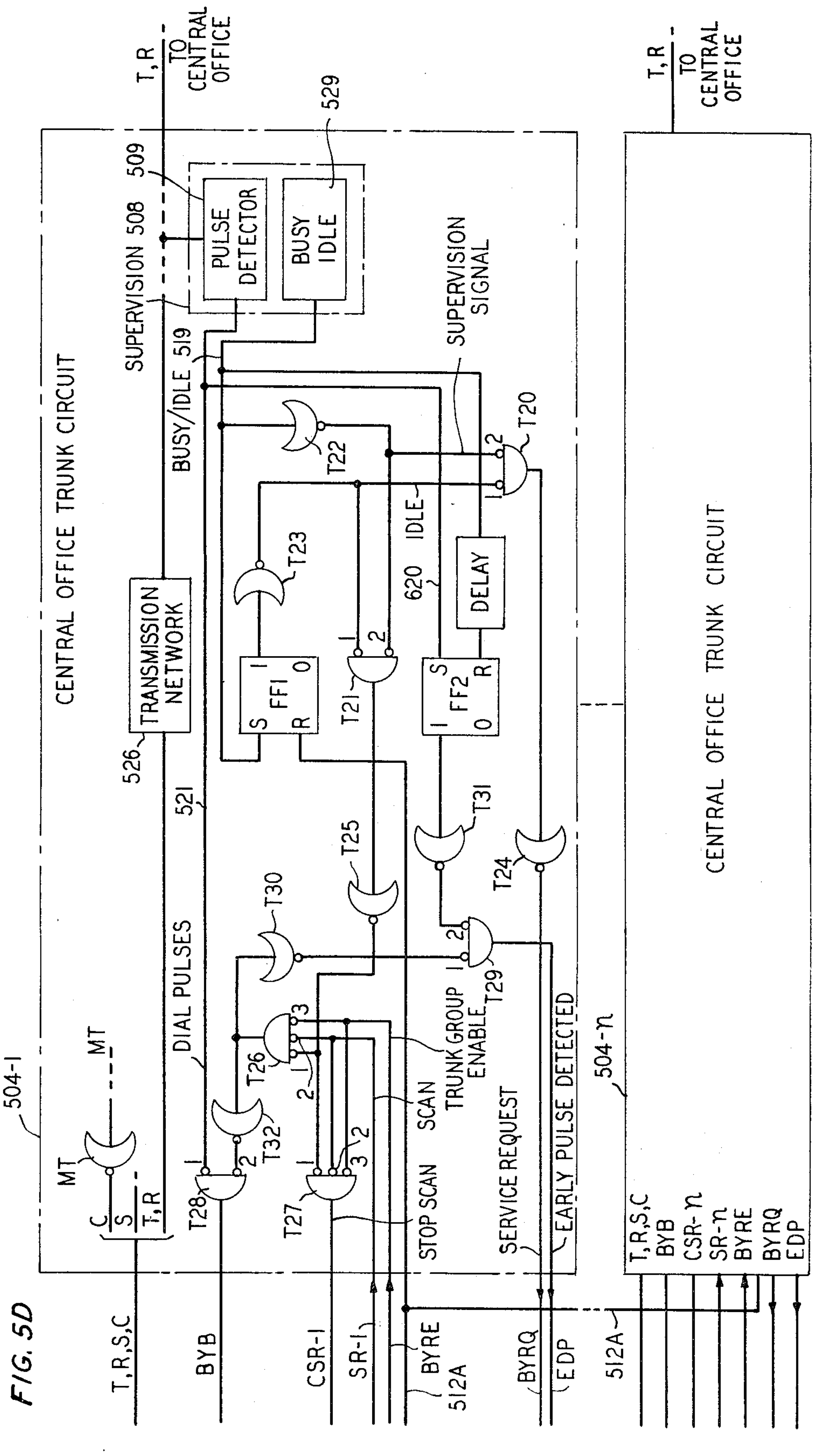
Figure 5E:
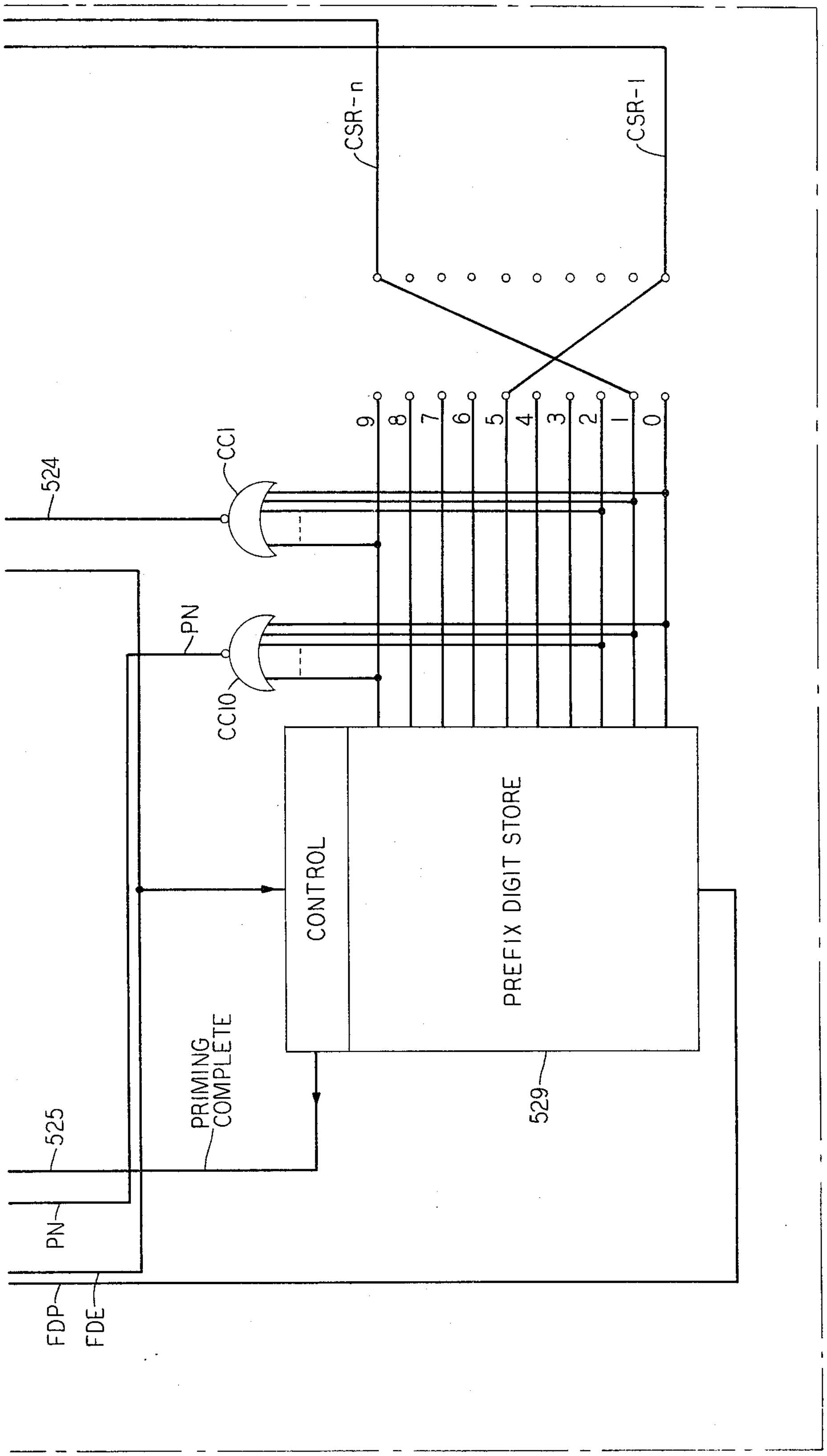

Lead CSR–1, as well as the corresponding leads from the other trunk circuits, are connected on FIG. 5E to a cross-connection field whose left side terminals extend to the inputs of OR gates CC1 and CC10 and as well as to the inputs of the prefix digit store 529. The function of the prefix digit store is to regenerate digits lost in the final stage of a step-by-step type office. The prefix digit store contains a plurality numbered input terminals 1 through 9 each of which may be energized by a stop-scan input signal. The circuit generates and registers a digit corresponding to the numbered input terminal that receives the stop scan signal. Thus a stop-scan signal received by terminal 1 enters a digit 1 into the store; a stop-scan signal on input terminal 9 enters a digit 9 in the store, etc. With respect to the presently described call, let it be assumed that the digit 5 is absorbed in the final stage of the central office and that this digit must be regenerated and applied to register 505–1 in order that a call connection may be completed to the correct PBX station. Thus, conductor CSR–1 is cross-connected to input 5 of the prefix digit store, and the reception of the stop-scan signal on this conductor enters the digit 5 into the store. The manner in which the prefix digit 5 is transmitted to the register is described in detail hereinafter.

The stop-scan signal from conductor CSR–1 is also applied to the OR gate CC1 and CC10. The output of gate CC1 is extended over conductor 524 to a stop-scan input of trunk scanner 510. The function of gate CC10 is later described. The reception of this signal stops the scanner in its position associated with trunk circuit 504–1. The output of OR gate CC1 is also extended via conductor 524 to the input of segment 523–B of the bylink sequence circuit 523. The function of this segment is to initiate the circuit actions required to select a digit register. The reception of the signal from conductor 524 indicates that the calling trunk has been identified and that the bylink sequence circuit may advance to its next position 523–B, to cause the system to select an idle digit register. The description of reset given here for the trunks will be clarified if the following changes are made:

1. Remove capacitor CL from the reset input of FF1 in trunk circuit 504–1 and replace it with a short circuit.
2. Delete the trunk reset description starting at line 6 page 32 and continuing through line 11, page 33.
3. Add a new (non-delay line type) version of trunk reset based on the path complete indication mentioned starting at line 2, page 41. The new version of reset will mention the same functions as were mentioned in the deleted version, only they will now be in their proper time perspective.

The reception of the stop-scan signal by gate CC1 on FIG. 6C applies a signal over conductor 524 to segment 523–B of the bylink sequence circuit which now initiates the circuit operations required to select an idle digit register. As a first step in this process, the segment applies a potential to conductor DRE. This conductor extends to the start-scan input of the register scanner control circuit 511A and further extends to all digit registers. The reception of this signal by the scanner initiates a register scanning operation. The reception of this signal by the registers partially enables them and prepares them for the scanning operation.

On FIG. 5A the digit register enable signal is received on input 3 of the SIC gate for register 505–1 and for the corresponding gates in the other registers. This signal is a low potential and it therefore partially enables the SIC gate in each register. Input 1 of the SIC gate of each register is connected to the register supervision circuit 517 by means of the busy-idle lead 520. This lead is high when the register is busy and is low when the register is idle. A high potential on this lead inhibits the SIC gate and prevents the register from being seized. Since it is assumed that register 1 is to serve the presently described call, lead 520 is low and therefore input 1 of gate SIC is partially enabled. Input 2 of the gate is connected by the ICA-1 conductor to position 1 of register scanner 511. This lead is driven low when the scanner scans this particular trunk circuit. When this occurs, input 2 of the gate is driven low. Since its other two inputs are now low, the gate turns off, assumes its AND state and drives its output high. The high on its output is propagated through the SIC and DSIC gates and applied as a stop-scan signal to conductor SICD. This conductor extends back to he stop-scan input of the scanner control circuit 511A to stop the register scanner in its position associated with register 505–1. The stop-scan signal on conductor SICD is also extended to the lower input of AND gate CC2 on FIGS. 5C. The other input of this AND gate comprises an indication from the trunk circuit as to whether first digit priming operation is necessary. If it is, as is assumed in the case of the present call, this signal is applied as a low to the upper input of the AND gate CC2 from the output of gate CC10. A signal appears on conductor PN only when a first F digit prefixing or priming operation is necessary. This applies a signal to segment 523–C of the bylink sequence circuit indicating that a first digit priming operation is necessary. In response to the receipt of this signal, segment 523–C applies an output signal to conductor FDE which extends to the control portion of the prefix digit store 524 and which also extends to FIG. 5A and input 2 of AND gate FP in the register. This signal is a low potential and it therefore partially enables AND gate FP. Input 3 of the same gate is low at this time by virtue of the low generated the output of gate SIC and propogated through gates SIC and FPI. The reception of the FDE signal by the shift control circuit causes a prefix digit to be outpulsed from the prefix digit store over conductor FDP to input 1 of AND gate FP. For the present call the prefix digit is a 5. Therefore a chain of five pulses is now outpulsed over conductor FDP to AND gate FP. Since the other two inputs of the gates are now enabled, the AND gate responds to these pulses and applies them to steering circuit 514 which steers them over the TH conductor to the appropriate location in digit storage circuit 516.

When the digit prefixing operation is completed, the control circuit for the prefix store transmits a signal over conductor 525 to OR gate CC4. If an early dial pulse has not been detected then lead EDP will be high into gate CC7 causing gate CC5 to be fully enabled. This steps the bylink sequence circuit to the segment 523–D. The function of this segment is to initiate the circuit operations required to connect the selected register to the calling trunk circuit by means of the bylink bus. A further function of this segment is to instruct the network to begin the establishment of a network path between the calling trunk circuit in the selected register.

It has been assumed in connection with the present call that a first digit prefixing operation is required. If such were not the case, the stop-scan signal on conductor SICD would pass through gates CC3, CC4, and CC5 to segment 523-D. It passes through gate CC3 since the high on lead PN into gate CC6 puts a partially enabling low on input 1 of gate CC3. When CC3 does go active, the high output is transmitted by OR gate CC4 as a partially enabling low to input 1 of CC5. Input 2 of CC5 will already be low, since lead EDP is assumed inactive or high into CC7. Thus segment 523-D of the bylink sequence is enabled. Segment 523-D applies a "bylink enable" potential to conductor BYE extending to input 1 of the BYIC gate in each register. This signal is a low and it partially enables the BYIC gate. Input 2 of the BYIC gate for register 505-1 is currently at a low potential under control of gate SIC. Therefore, the reception of the BYE signal switches gate BYIC to its AND state in which its output is high. This disables gate BYLB. Inputs 2 and 3 of gate BYLA are paralleled with inputs 1 and 2 of gate BYIC and therefore BYLA gate is partially enabled and is prepared to respond to signals on the bylink bus.

Common control now initiates the circuit actions required to cause the switching network to begin the establishment of a network path between the calling trunk circuit and the selected register. The switching network is of the end marked type and therefore this request is transmitted to it by marking the C lead line side network appearance of the register and the C lead trunk side appearance of the trunk circuit. On FIG. 5A the C lead line appearance of the register is connectable to ground potential by the gate MLS. The trunk side C lead appearance can similarily be grounded signalwise by operating gate MTS. The trunk circuit C lead appearance is grounded signalwise by operating gate MT. The manner in which these gates are operated is identical to the mark relays shown in the Abbott et al patent to which reference is made for such details. All that need be said at this point with respect to the present call, is that the operation of gate MLS in the register and the operation of gate MT in the trunk grounds the network appearances of these two circuits so that the end marked network 501 then begins its function of finding and establishing a network path between the two circuits.

For reasons already described, it is entirely possible, and probable, that pulses may be received representing the next dial digit prior to the time that the required network path between the two circuits is completed. Such pulses are received by the trunk circuit and transmitted from the trunk circuit over the bylink bus to the register in accordance with our invention.

The reception of the first dial pulse at this time prior to the establishment of the network path is detected as a low-going signal on conductor 520 on FIG. 5D. This low is applied to the set input of flip-flop 2 to switch it from a reset to a set state. This drives its 1 output high and, in turn, input 2 of gate T29 low. The other input of this gate is low so that the gate applies to conductor EDP a signal indicating that a dial pulse has been detected. The purpose of transmitting this signal to common control is subsequently described.

The number 2 input of AND gate T28 remains low (enabled) at this time for reasons already described. The dial pulses appearing on conductor 521 are applied to input 1 of the gate and they pass through it to the bylink bus. From there they are applied over the bus to the register and in turn to input 1 of the BYLA AND gate of the register. Each low representing a pulse passes through the gate, is detected by dial pulse detectors 513, and applied to the steering circuit 514. The steering circuit applies each sequence of pulses to the proper order of the digit storage circuit 516 in which counts each such series registers them in the conventional manner.

The transmission of pulses over the bylink bus in this manner continues until a path between the same two circuits is established by the network. At that time, a path complete signal is transmitted from the network to common control over conductor 512 where the signal is applied to the next segment of the bylink sequence circuit, namely segment 523-F. The function of this segment is to reset the common control and thereby restore the bylink circuit to normal so that it may be available for the serving of other calls requiring bylink circuits. Segment 523-F initiates this sequence of operation by applying a reset signal to the mode control, thus disabling the bylink sequence circuit. This drives conductor DRE high extending to the register and drives conductor BYRE high extending to the trunk circuit. The high on conductor DRE inhibits gate SIC. This drives the output of the gate low and by means of gate SIC and DSIC drives the stop-scan conductor SICD low. The low on the output of gate SIC is also extended through gate SIC and FPI to inhibit gate BYIC by means of its input 2. It also inhibits gate BYLA at its input 3. The inhibiting of gate BYLA functionally disconnects the register signalwise from the bylink bus. The inhibiting of gate BYIC drives its output low to enable input 1 of gate BYLB. Input 2 of this gate is connected to terminal 515 which receives the dial pulse transmitted to supervision circuit 515 over the tip and ring conductors after the network path is established. Any dial pulses appearing on conductor 515 pass through gate BYLB to the pulse detector 513. From then on elements 514 and 516 steer and register the pulse trains in the conventional manner. Subsequently, the register transmits an indication over path 529-1 to the digit storage element 528 of common control to indicate to that circuit what digits have been dialed. From then on, common control may respond in the manner described in the Abbott et al. patent to serve the call. Conductor 512 normally holds the reset input of flip-flop 1 high. The flip-flop is normally in a set state during the idle condition of the circuit since its set input is low and its reset input is high. When the trunk is seized, the set input goes high. This does not change the conductive state of the gate for reasons already mentioned. However, when a "path complete" signal is received from the network via conductor 512 and 512A, a low is applied to the reset terminal of flip-flop 1. Since its set input is high this causes flip-flop 1 to switch from a set to a reset state. The resetting of the flip-flop drives its 1 output low and the output of OR gate 23 high as an input signal to input 1 of AND gate T20. This inhibits the gate and removes the service request signal on conductor BYRQ by making the conductor go high. The high on the output of gate T23 is also connected to input 1 of gate T21 to inhibit it. This drives the output of the gate low and the output of OR gate T25 high extending to input 1 of gates T26 and T27 to inhibit them. The inhibiting of gate T27 removes the stop-scan signal from conductor CSR-1. The inhibiting of gate T26 drives its output low extending to gates T29, T30 and T32. The high (from gate T32) on the input 2 of gate T28 inhibits it so that it will no longer be responsive to dial pulses. The high on input 1 of gate T29 inhibits it so that it will not be responsive to a subsequent change of state from flip-flop 2. Conductor EDP extends from the trunk circuit to gates CC7 and CC9. Only if this signal is received prior to the time that the digit register and the trunk circuits are connected by the bylink bus, will gate CC9 be fully enabled and the common control initiate the circuit action required to prevent the connection to the register and instead to connect the trunk circuit to tone source 527 to provide a tone back to the calling party indicating that the call cannot currently be completed and instead should be reattempted. This is so because lead BYE, which enables the digit register trunk connection via the bylink, drives gate CC8 which controls input 3 of AND gate CC9. Thus if lead BYE goes active or low before lead EDP goes active or low then input 3 of CC9 will be high to inhibit that gate and segment 523-E of the bylink sequence. On the other hand, if EDP goes active or low before BYE goes active or low then gate CC7 transmits a high to input 2 of CC5 thus inhibiting that gate and segment 523-D of the bylink sequence. Also EDP going low at input 1 of CC9 partially enables that gate. With segment 523-D inhibited, lead BYE remains inactive or high to gate CC8 which makes input 3 of CC9 low to further partially enable it. When the output of CC4 goes low, either when digit register priming is completed or when the trunk is selected with indications that priming is unnecessary, then input 2 of CC9 goes low to fully enable that gate and hence segment 523–E of the bylink sequence.

The reason for this action is that if the leading edge of a dial pulse is received prior to the time the bylink path is established, there is no assurance that the valid information for the first digit will be transmitted to the register. The reason for this is that conductor EDP goes high when the leading edge of the first dial pulse is detected, and it remains high for the rest of the call. This being the case the system does not have the complexity required to determine how many dial pulses have been received prior to the establishment of the bylink connection. Therefore, under such conditions the call is aborted and connected to a busy or reorder tone source 627.

As described previously the last step in the sequence of operation of the bylink sequence circuit steps to segment 523F as an indication that a connection between a calling trunk circuit and reorder tone source 527 have been completed. At this time segment 523F transmits a signal back to mode control 506 indicating that it may now advance and serve another work request by the system.

The preceding description of our invention has been simplified by showing in detail only a signal bylink bus 507 connected to a plurality of registers 505 and to a plurality of trunk circuits 504. Such an arrangement would be suitable only for small offices since, when so equipped, the office could serve only a single bylink call connection at a time. This is due to the fact that a single bylink bus could serve only one call at a time. Larger offices will have the register and trunk circuits (that serve bylink calls) subdivided into groups with each group having its own bylink bus which is connected between all registers and all trunk circuits of the group. This permits the office to serve as many bylink calls at a time as there are bylink buses. Such an arrangement is diagrammatically shown on FIG. 5B where trunk circuits 504A represent a different group of trunk circuits apart from trunk circuits 504 on FIG. 5D. Trunk circuits 504A are shown connected to a second bylink bus 507A which extend to other registers which are not shown in detail. FIG. 5B also shows central trunk office circuits 550 which do not require bylink services and which are therefore not connected to a bylink bus. Trunk circuits 504A and 550 contain control conductors extending to common control.

The manner in which the calls received by trunk circuits 550 are served is fully described in the Abbott et al. patent. The calls received by trunk circuits 504A are served in a manner analogous to that already described for trunk circuit 504.

Common control has been simplified in the present specification by disclosing only the control circuitry for a single group of bylink trunks namely 504. For the group of bylink trunks 504A, separate register and trunk scanners are required as well as a separate prefix digit store. Also a separate bylink sequence circuit 523 and the circuitry connected thereto would be required for each additional group of bylink trunk circuits and their associated registers.

What is claimed is:

1. In a switching system, a switching network, a plurality of registers each having an individual appearance on a first side of said network, a plurality of central office trunk circuits each having an individual appearance on a second side of said network, means responsive to the receipt of a call by one of said trunk circuits for requesting said network to establish a path between said one trunk circuit and an idle one of said registers, a bylink bus common to all of said registers and to all of said trunk circuits, means additionally responsive to the receipt of said call for connecting both said one trunk circuit and said one register signalwise to said bylink bus, means effective prior to the establishment of said network path for transmitting any pulses received by said one trunk circuit to said register over said bylink bus, and means for disconnecting signalwise said one trunk circuit and said register from said bylink bus in response to the establishment of said network path to said register.

2. The system of claim 1 in combination with means for detecting the receipt of a dial pulse by said trunk circuit prior to the signalwise connection of said trunk circuit and said register via said bylink bus, and means responsive to said detection for aborting the establishment of said network path to said register.

3. In a switching system, a switching network, a system controller, a plurality of registers each having an individual appearance on a first side of said network, a plurality of central office trunk circuits each having an individual appearance on a second side of said network, means including said controller responsive to the receipt of a call by one of said trunk circuits for requesting said network to establish a path between said one trunk circuit and an idle one of said registers, a bylink bus common to all of said registers and to all of said trunk circuits, a selectively controllable gate in each of said trunk circuits, a selectively controllable gate in each of said registers, means in said controller responsive to the receipt of said call for energizing the gate in said one trunk circuit and the gate in said one register to connect both said trunk circuit and said register signalwise to said bylink bus, means in said one trunk circuit for transmitting to said register over said bylink bus any pulses received during the serving of said call prior to the establishment of said network path to said register, and means for deenergizing said gate in said trunk circuit and in said register in order to disconnect signalwise said trunk circuit and said register from said bylink bus in response to the establishment of said network path.

4. The system of claim 3 in combination with means in said one trunk circuit for detecting the receipt of a first pulse during the serving of said call, means in said trunk circuit for transmitting a signal to said controller indicating the receipt of said first pulse, and means in said controller responsive to the receipt of said signal prior to the signalwise connection of said trunk circuit and said register via said bylink bus for aborting the establishment of said network path to said register.

5. The system of claim 4 in combination with digit prefixing facilities comprising; a prefix digit bus connected to all of said registers and to said system controller, means in said controller responsive to the receipt of said call for determining whether a prefix digit is required to be entered into said one register, and means responsive to a determination that a prefix digit is required for transmitting said digit over said prefix bus to said one register prior to the receipt of pulses by said one register from said one trunk circuit.

6. In a switching system, a switching network, a system controller, a plurality of registers each having an individual appearance on a first side of said network, a plurality of central office trunk circuits each having an individual appearance on a second side of said network, means responsive to the receipt of a call by a calling one of said trunk circuits for transmitting a service request signal from said calling trunk circuit to said controller, a trunk scanner in said controller, means including said trunk scanner responsive to the receipt of said service request signal for scanning said trunk circuits to identify said calling trunk circuit, a register scanner in said controller, means responsive to the identification of said calling trunk circuit for scanning said registers to select an idle one of said registers, means responsive to the selection of said one idle register for requesting said network to establish a path between said calling trunk circuit and said register, a bylink bus common to all of said registers and to all of said trunk circuits, a selectively controllable gate in each of said trunk circuits, a selectively controllable gate in each of said registers, means in said controller responsive to the selection of said register for energizing the gate in said calling trunk circuit and the gate in said register to connect said calling trunk circuit and said register signalwise to said bylink bus, means in said calling trunk circuit for transmitting over said bus to said register any pulses received prior to the establishment of said network path to said register, means in said register for counting and storing all pulses received from said trunk circuit via said bus, and means for disconnecting signalwise said calling trunk circuit and said register from said bus upon the establishment of said network path, said counting and storing means then being effective to count and store all pulses received by said register over said network path from said calling trunk circuit.

7. The system of claim 6 in combination with a tone source means in said calling trunk circuit for detecting the receipt of said first pulse during the serving of a call, means in said trunk circuit for transmitting a signal to said controller indicating the receipt of said first pulse, and means in said controller responsive to the receipt of said signal prior to the signalwise connection of said calling trunk circuit and said register via said bylink bus for aborting the establishment of said network path to said register and for requesting the establishment of a network connection between said trunk circuit and said tone source.

8. The system of claim 7 in which said means for detecting comprises; a two state device, means for maintaining said device in a reset state prior to the receipt of the first dial pulse during the serving of a call, means for switching said device to its set state upon the reception of said first pulse, means effective when said device is switched to its set state for generating said signal indicating the receipt of said first pulse.

9. The system of claim 7 in combination with digit prefixing facilities comprising; a prefix digit bus connected to all of said registers and to said system controller, a prefix digit gate in said one register with said gate being connected between said prefix digit bus and said digit counting means of said one register, means in said controller responsive to the receipt of said service request signal from said calling trunk circuit for determining whether a prefix digit is to be entered into said one register, and means responsive to a determination that a prefix digit is required by said one register on said call for energizing the prefix digit gate of said one register and for transmitting said digit over said prefix bus to said one register prior to the receipt of dial pulses by said one register from said calling trunk circuit.

10. The system of claim 9 in which said means for determining comprises; a prefix digit store having a plurality of inputs each of which represents a different prefix digit, connection means for applying a service request signal received from a calling trunk circuit to the one of said inputs that represents the prefix digit to be generated for each call served by said trunk circuit, and means responsive to the receipt of a signal on any one of said inputs for generating an energizing signal for the prefix digit gate of said one register, said prefix digit store being responsive to the receipt of a signal on any one of its inputs for transmitting a digit associated with said one input over said prefix bus to said one register.

11. In a switching system, a switching network, a plurality of groups of registers with each register having an individual appearance on a first side of said network, a plurality of groups of central office trunk circuits with each circuit having an individual appearance on a second side of said network, a plurality of bylink buses each of which is common to both a different group of said registers and to a different group of said trunk circuits, means responsive to the receipt of a call by any calling one of said trunk circuits for requesting said network to establish a path between said calling trunk circuit and an idle one of the registers common to the bus to which said calling trunk circuit is common, means additionally responsive to the receipt of said call for connecting said calling trunk circuit and said idle one register signalwise to the bylink bus common to said trunk circuit and said register, means effective prior to the establishment of said network path for transmitting any pulses received by said calling trunk circuit to said one register over said bylink bus, and means for disconnecting signalwise said calling trunk circuit and said register from said bylink bus in response to the establishment of said network path to said register.

* * * * *